United States Patent
Boutaleb et al.

(10) Patent No.: US 12,110,826 B2
(45) Date of Patent: Oct. 8, 2024

(54) ASSEMBLY FOR AIRCRAFT TURBINE ENGINE COMPRISING AN IMPROVED SYSTEM FOR LUBRICATING A FAN DRIVE REDUCTION GEAR

(71) Applicant: SAFRAN AIRCRAFT ENGINES, Paris (FR)

(72) Inventors: Mohammed-Lamine Boutaleb, Moissy-Cramayel (FR); Nicolas Vincent Pierre-Yves Cotereau, Moissy-Cramayel (FR); Sébastien Oriol, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 102 days.

(21) Appl. No.: 17/995,204

(22) PCT Filed: Mar. 26, 2021

(86) PCT No.: PCT/FR2021/050540
§ 371 (c)(1),
(2) Date: Sep. 30, 2022

(87) PCT Pub. No.: WO2021/198602
PCT Pub. Date: Oct. 7, 2021

(65) Prior Publication Data
US 2023/0175438 A1  Jun. 8, 2023

(30) Foreign Application Priority Data
Apr. 2, 2020 (FR) .................................... 2003309

(51) Int. Cl.
*F02C 7/06* (2006.01)
*F01D 25/18* (2006.01)
(Continued)

(52) U.S. Cl.
CPC ................ *F02C 7/06* (2013.01); *F01D 25/18* (2013.01); *F01D 25/20* (2013.01); *F02C 7/32* (2013.01);
(Continued)

(58) Field of Classification Search
CPC ...... F02C 7/06; F02C 7/32; F02C 7/36; F01D 25/18; F01D 25/20
See application file for complete search history.

(56) References Cited

U.S. PATENT DOCUMENTS 3,052,444 A * 9/1962 Kintner ................. F16K 31/122
92/108
4,452,037 A * 6/1984 Waddington ............ F01D 25/18
60/39.08
(Continued)

FOREIGN PATENT DOCUMENTS

| FR | 2987402 A1 | 8/2013 |
| FR | 3083266 A1 | 1/2020 |
| WO | 2019243710 A1 | 12/2019 |

OTHER PUBLICATIONS

International Search Report for issued in Application No. PCT/FR2021/050540 dated Jul. 19, 2021.
(Continued)

*Primary Examiner* — Jake Cook
(74) *Attorney, Agent, or Firm* — Pearne & Gordon LLP

(57) ABSTRACT

An assembly for an aircraft turbine engine includes a fan drive reduction gear and a lubrication system including: a reduction gear housing; a lubricant tank; a lubricant supply circuit including a feed pump; and a lubricant recovery circuit including a pump for recovering lubricant from the reduction gear housing. The recovery circuit includes a lubricant distributor, including: a lubricant inlet communicating with a lubricant outlet of the housing; an air inlet; and a distributor outlet, the distributor being able to adopt a
(Continued)

lubricant recovery configuration and a configuration for retaining the lubricant in the housing.

10 Claims, 5 Drawing Sheets

(51) Int. Cl.
    *F01D 25/20*     (2006.01)
    *F02C 7/32*     (2006.01)
    *F02C 7/36*     (2006.01)

(52) U.S. Cl.
    CPC .......... *F02C 7/36* (2013.01); *F05D 2220/323* (2013.01); *F05D 2240/54* (2013.01); *F05D 2240/60* (2013.01); *F05D 2260/40* (2013.01); *F05D 2260/98* (2013.01)

(56) References Cited

U.S. PATENT DOCUMENTS

| | | | | |
|---|---|---|---|---|
| 8,356,694 | B2* | 1/2013 | Jones | F01D 25/16 |
| | | | | 184/6.11 |
| 9,238,975 | B2* | 1/2016 | Detry | F16K 17/046 |
| 10,082,077 | B2* | 9/2018 | Denman | F02C 7/06 |
| 10,520,035 | B2* | 12/2019 | Duffy | F16C 35/04 |
| 11,168,798 | B2* | 11/2021 | Girouard | F16K 17/38 |
| 2019/0187732 | A1* | 6/2019 | Angevin | F02C 6/08 |

OTHER PUBLICATIONS

Written Opinion for PCT/FR2021/050540 dated Jul. 19, 2021.
Search Report issued in French Patent Application No. 2003309 dated Nov. 19, 2020.

* cited by examiner

ASSEMBLY FOR AIRCRAFT TURBINE ENGINE COMPRISING AN IMPROVED SYSTEM FOR LUBRICATING A FAN DRIVE REDUCTION GEAR

This is the National Stage of PCT international application PCT/FR2021/050540, filed on Mar. 26, 2021 entitled "ASSEMBLY FOR AIRCRAFT TURBINE ENGINE COMPRISING AN IMPROVED SYSTEM FOR LUBRICATING A FAN DRIVE REDUCTION GEAR", which claims the priority of French Patent Application No. 2003309 filed Apr. 2, 2020, both of which are incorporated herein by reference in their entireties.

TECHNICAL FIELD

The present invention relates to the field of the aircraft turbine engines, and more specifically to the turbine engines comprising a fan driven by a reduction gear, as is for example known from the document FR 2 987 402 A1.

The invention relates in particular to the management of the lubrication of the reduction gear, in the case of autorotation of the fan.

STATE OF THE PRIOR ART

On the aircraft turbine engines comprising a fan driven by a reduction gear, the latter is generally arranged in a lubricated enclosure through which the lubricant supplied by a supply pump circulates. This pump is mechanically driven by a shaft of the turbine engine, usually the high pressure shaft.

In the case of shutdown of the turbine engine during flight, the fan is no longer driven by the reduction gear, but it continues to rotate under the effect of the air flowing which passes therethrough. Under these conditions, the fan is said to be in autorotation, or even in "windmilling" or "in windmill". These conditions can also be encountered on the ground, when the turbine engine is turned off.

Even if the autorotation speeds of the fan remain relatively low, in particular when the aircraft is on the ground, there may nevertheless remain a need for lubrication of the reduction gear driven by this fan. However, the lubrication of the reduction gear, however, can no longer be ensured by the supply pump alone, because the high pressure shaft is stopped or rotates at a too low speed to allow this pump to introduce a sufficiently high lubricant flow rate into the enclosure.

The existing solutions to ensure the lubrication of the reduction gear under these conditions generally set up a secondary oil circuit with an auxiliary tank, and an associated auxiliary pump. A secondary oil circuit generally has drawbacks in terms of mass, space requirement, complexity, cost and reliability.

There is consequently a need to optimise the existing solutions, in order to ensure the management of the lubrication of the reduction gear in the case of autorotation of the fan.

DISCLOSURE OF THE INVENTION

In order to at least partially meet this need, the object of the invention is first of all an assembly for an aircraft turbine engine, the assembly comprising a fan drive reduction gear of the turbine engine, as well as a lubrication system (24) including:

a reduction gear enclosure, lubricated and containing the fan drive reduction gear;
a lubricant tank;
a lubricant supply circuit connecting the tank to the reduction gear enclosure, the supply circuit comprising a lubricant supply pump;
a lubricant recovery circuit connecting the reduction gear enclosure to the tank, the recovery circuit comprising a pump for recovering lubricant from the reduction gear enclosure.

According to the invention, the lubricant recovery circuit includes a controlled lubricant dispenser, comprising:

a lubricant inlet communicating with a lubricant outlet of the reduction gear enclosure;
an air inlet; and
a dispenser outlet communicating with the recovery pump, the controlled lubricant dispenser being configured so as to be able to adopt several configurations, among which:

a lubricant recovery configuration, in which the dispenser communicates the lubricant inlet thereof with the outlet thereof, and prohibits the communication between the air inlet thereof and the outlet thereof; and
a configuration for blocking the lubricant in the enclosure, a configuration in which the dispenser communicates the air inlet thereof with the outlet thereof, and prohibits the communication between the lubricant inlet thereof and the output thereof.

The invention thus allows ensuring, in a simple, reliable and efficient manner, a suitable lubrication of the reduction gear in the case of autorotation of the fan. Indeed, when the dispenser is switched to the blocking configuration, the lubricant is kept in the enclosure of the reduction gear, from which it cannot escape. In addition, the low lubricant flow rate from the supply pump allows adding lubricant into the enclosure, so as to ensure the bubbling of at least one portion of the gear assembly of this reduction gear.

Furthermore, in this blocking configuration adopted by the lubricant dispenser, the recovery pump sucks air from the air inlet of the dispenser, which allows avoiding creating vacuum in the lubricant recovery circuit.

In particular, the invention proves to be advantageous in that it does not require the integration of an additional pump or tank to ensure the lubrication of the reduction gear under the autorotation conditions.

The invention moreover has at least one of the following optional characteristics, taken individually or in combination.

Preferably, the lubricant dispenser is controlled depending on the lubricant pressure in the lubricant supply circuit. Indeed, a high pressure of lubricant in this circuit testifies to a normal operation of the supply pump, and therefore to the introduction of a normal flow rate within the enclosure of the reduction gear, allowing properly lubricating the reduction gear of the turbine engine in operation. Conversely, a low lubricant pressure in the supply circuit testifies to an idle operation of the supply pump, observed for example during a autorotation phase of the fan. In this case, the lubricant flow rate introduced into the enclosure may prove to be insufficient to lubricate the reduction gear whose gear assembly continues to rotate during the autorotation phase. Consequently, a high lubricant pressure within the supply circuit should lead to bringing the dispenser into its lubricant recovery configuration, while a lower pressure, for example falling below a threshold value, should lead to bring the dispenser into its lubricant blocking configuration.

If the invention preferably provides for controlling the lubricant dispenser depending on the lubricant pressure in the supply circuit, other control solutions remain possible. This is, for example, a solution aimed at detecting autorotation phases, for example using a fan rotation speed sensor.

Preferably, the lubricant dispenser includes a body, as well as a member which is movably mounted in the body between a first position bringing the dispenser into the lubricant recovery configuration, and a second position bringing the dispenser into the configuration for blocking the lubricant in the enclosure, the movable member being subjected to a first force applied by an elastic return element forcing this movable member to its second position, and a second pressure force applied by the lubricant taken from the supply circuit, and forcing this movable member to its first position. This is a particularly simple and reliable mechanical/hydraulic solution.

Preferably, the dispenser takes the form of an actuator whose cylinder is formed by the body and whose piston is formed by the movable member. In addition, the lubricant inlet, the air inlet, and the dispenser outlet being orifices through the cylinder.

Preferably, the piston formed by the movable member includes two piston heads between which a fluid circulation chamber is defined.

It is noted that if the mechanical/hydraulic solution presented above is preferred, an electrical solution remains possible, for example by implementing a lubricant pressure sensor within the supply circuit.

Preferably, the supply circuit includes a heat exchanger through which the lubricant circulates.

Preferably, the Assembly Includes:
 at least one turbine engine shaft rolling bearing;
 at least one lubricated motor enclosure containing the rolling bearing.

Moreover, Preferably:
 the lubricant supply circuit also connects the tank to each lubricated motor enclosure; and
 the lubricant recovery circuit also connects each motor enclosure to the tank, the recovery circuit further comprising a lubricant recovery pump associated with each motor enclosure.

Preferably, the Assembly Includes:
 an accessory gearbox of the turbine engine;
 an accessory gearbox enclosure, lubricated and containing the accessory gearbox.

Moreover:
 the lubricant supply circuit also connects the tank to the accessory gearbox enclosure; and
 the lubricant recovery circuit also connects the accessory gearbox enclosure to the tank, the recovery circuit further comprising a pump for recovering lubricant from the accessory gearbox enclosure, Preferably, the supply pump, the pump for recovering lubricant from the accessory gearbox enclosure, as well as the pump for recovering lubricant from the reduction gear enclosure, are mechanically driven by the accessory gearbox.

Of course, the two preferred solutions described above can be combined, namely that the assembly according to the invention preferably incorporates all enclosures described above, including one or more lubricated motor enclosures, as well as the elements described above, associated with these enclosures.

The invention also relates to an aircraft turbine engine comprising such an assembly, the turbine engine including a fan driven by the reduction gear of this assembly, a compressor, and the air inlet of the lubricant dispenser preferentially communicating with the compressor, preferably a high pressure compressor.

Alternatively, the air inlet of the lubricant dispenser can be connected to the secondary flow path of the turbine engine, when said turbine engine has a bypass design. In this respect, it is noted that the turbine engine is preferably a twin-spool and bypass turbojet engine.

Finally, it is noted that the turbine engine preferably includes a motor shaft, preferably a high pressure shaft, mechanically driving the accessory gearbox.

Other advantages and features of the invention will appear in the non-limiting detailed description below.

BRIEF DESCRIPTION OF DRAWINGS

This description will be done with regard to the appended drawings, among which.

DETAILED DISCLOSURE OF PREFERRED EMBODIMENTS

Figure 1:
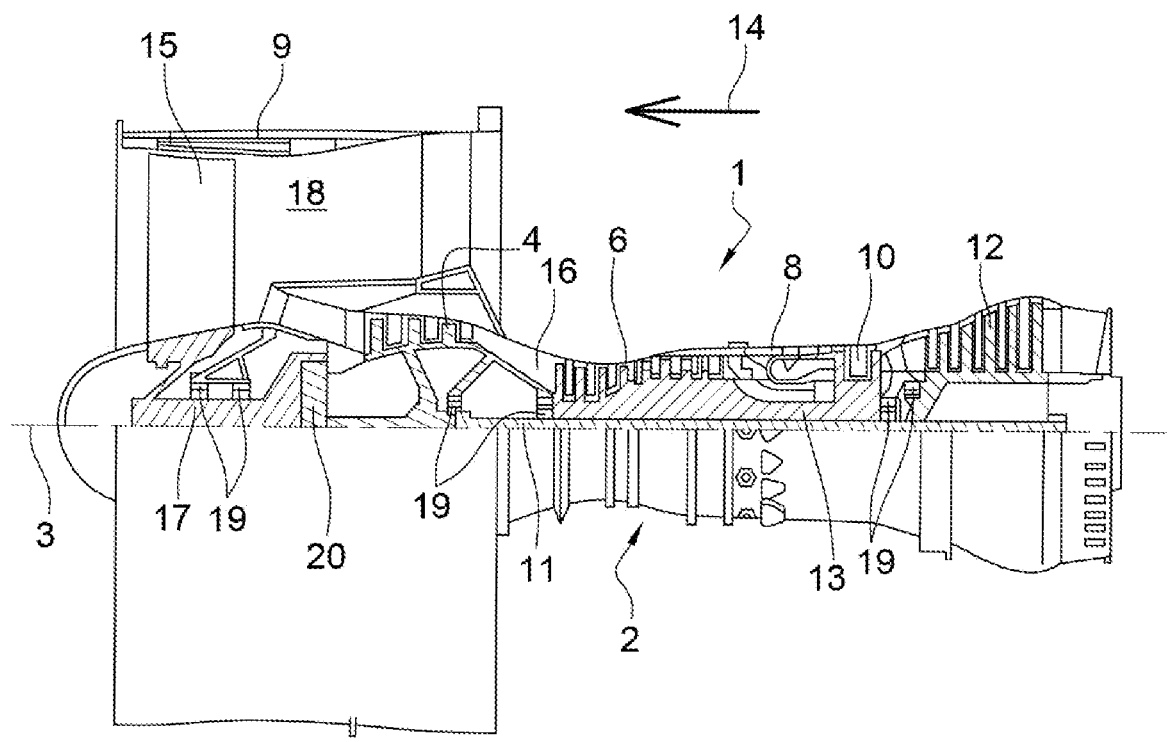
FIG. 1 represents a schematic side view of a turbojet engine according to the invention.

With reference to FIG. 1, a bypass and twin-spool turbojet engine 1 is represented. The turbojet engine 1 conventionally includes a gas generator 2, on either side of which, a low pressure compressor 4, and a low pressure turbine 12 are arranged. The gas generator 2 comprises a high pressure compressor 6, a combustion chamber 8 and a high pressure turbine 10. Subsequently, the terms "front" and "rear" are considered in a direction 14 opposite to the main flow direction of the gases within the turbojet engine, this direction 14 being parallel to the longitudinal axis 3 of the turbojet engine. The terms "upstream" and "downstream" are, however, considered according to the main flow direction of the gases through the turbojet engine.

The low pressure compressor 4 and the low pressure turbine 12 form a low pressure body, and are connected to each other by a low pressure shaft 11 which is centred on the axis 3. Similarly, the high pressure compressor 6 and the high pressure turbine 10 form a high pressure body, and are connected to each other by a high pressure shaft 13 which is centred on the axis 3 and arranged about the low pressure shaft 11. The shafts are supported by rolling bearings 19, which are lubricated by being arranged in oil enclosures.

The same applies to the fan hub 17, also supported by rolling bearings 19.

The turbojet engine 1 also includes, at the front of the gas generator 2 and the low pressure compressor 4, a fan 15 which is herein arranged directly at the rear of an air inlet cone of the motor. The fan 15 is rotary along the axis 3, and surrounded by a fan casing 9. This fan is not driven directly by the low pressure shaft 11, but driven indirectly by this shaft via a reduction gear 20, which allows it to rotate with a slower speed. As will be detailed hereinafter, the reduction gear 20 is also housed in an oil enclosure to allow its lubrication.

Figure 2:
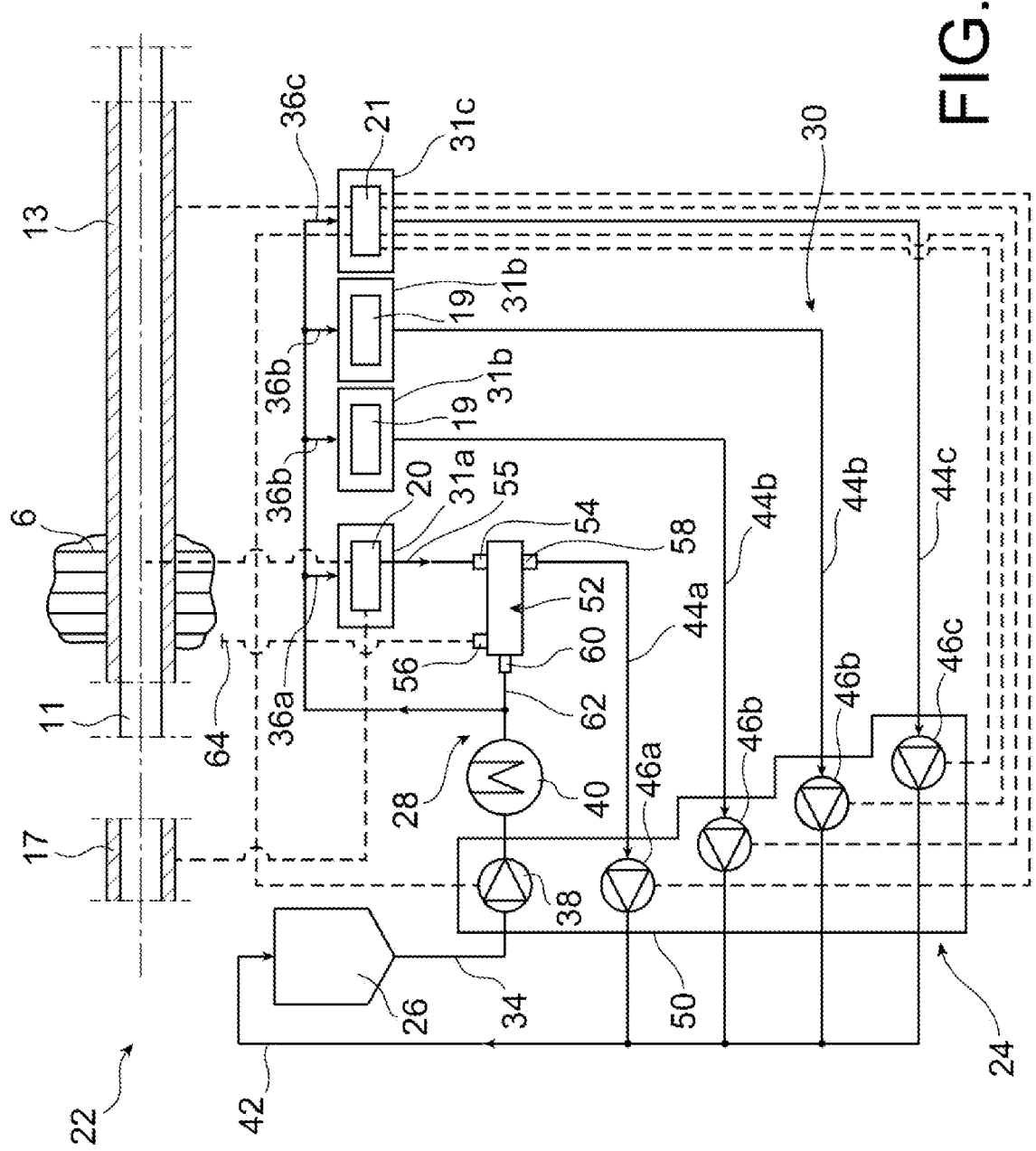
FIG. 2 represents a schematic side view of an assembly according to a preferred embodiment of the invention, this assembly equipping the turbojet engine of the preceding Figure.

Furthermore, the turbojet engine 1 defines a primary flow path 16 intended to be passed through by a primary flow, as well as a secondary flow path 18 intended to be passed through by a secondary flow located radially outwardly relative to the primary flow. Now, with reference to FIG. 2, an assembly 22 specific to the invention is represented, comprising the reduction gear 20, the rolling bearings 19, an accessory gearbox 21, as well as a system 24 allowing its lubrication.

The accessory gearbox 21, also called AGB, is mechanically driven by the high pressure shaft 13. Conventionally, it is configured to driven, in turn, several items of equipment of the turbojet engine, including pumps of assembly 22 which will be described hereinafter. The lubrication system 24 generally includes a lubricant tank 26, a lubricant supply circuit 28, a lubricant recovery circuit 30, and lubricated enclosures 31a, 31b, 31c. Among these enclosures, a first lubricated enclosure 31a is provided, called reduction gear enclosure because it contains the reduction gear 20 intended to be lubricated in this enclosure. Several second lubricated enclosures 31b are also provided, herein two second enclosures, called motor enclosures and each containing one or more rolling bearings 19. Finally, a third lubricated enclosure 31c is provided, called accessory gearbox enclosure because it contains the gearbox 21 intended to be lubricated in this chamber.

The lubricant supply circuit 28 connects the tank 26 to each of the enclosures 31a, 31b, 31c, for example via a common pipe 34 from which connectors 36a, 36b, 36c extend, supplying respectively the enclosures 31a, 31b, 31c.

The common pipe 34 of the supply circuit 28 is equipped with a lubricant supply pump 38, and a heat exchanger 40 through which the lubricant, preferably oil, passes. This exchanger 40 is for example of the air/oil exchanger type. On the common pipe 34, the supply pump 38 is arranged between the tank 26 and the exchanger 40.

The lubricant recovery circuit 30 includes a common pipe 42, communicating with an inlet of the tank 26 and on which pipes which are specific to each enclosure are connected. Thus, a first pipe 44a is provided connecting the reduction gear enclosure 31a to the common pipe 42. This first pipe 44a is equipped with a pump 46a for recovering lubricant from the reduction gear enclosure 31a. Similarly, two second pipes 44b are provided connecting each motor enclosure 31b to the common pipe 42. Each second pipe 44b is equipped with a pump 46b for recovering lubricant from the motor enclosure 31b. Finally, a third pipe 44c is provided connecting the gearbox enclosure 31c to the common pipe 42. This third pipe 44c is equipped with a pump 46c for recovering lubricant from the gearbox enclosure 31c.

All pumps 38, 46a, 46b, 46c which are mentioned above are preferably mechanically driven by the accessory gearbox 21. Preferably, they are part of the same group of pumps, said lubrication group referenced 50 in FIG. 2 These pumps 38, 46a, 46b, 46c are all mechanically driven by the accessory gearbox 21.

One of the particularities of the invention lies in the presence of a controlled lubricant dispenser 52, equipping the first pipe 44a at the outlet of the reduction gear enclosure 31a. The dispenser 52 includes a lubricant inlet 54 communicating with a lubricant outlet 55 of the gearbox enclosure 31. It also comprises an air inlet 56, as well as a dispenser outlet 58 communicating with the recovery pump 46a.

The air inlet 56 is supplied with air, preferably with ambient air, for example via a pipe 64 which is connected to or in the vicinity of a compartment of an inter-flow path zone of the turbine engine, also called "Core compartment". The term "ambient air" means air whose pressure is at least approximately equal to that of the air outside the turbine engine. Alternatively, the pipe 64 is connected to the secondary flow path of the turbojet engine, or even to a compartment of a nacelle of the turbine engine which is in the ambient air, for example a fan compartment.

The controlled lubricant dispenser 52, arranged between the reduction gear enclosure 31a and the pump 46a, has a design such that it is passively controlled by the lubricant pressure in the common pipe 34 of the supply circuit 28. To do this, the dispenser 52 includes a secondary lubricant inlet 60, communicating with the common pipe 34 via a connector 62.

Figure 3:
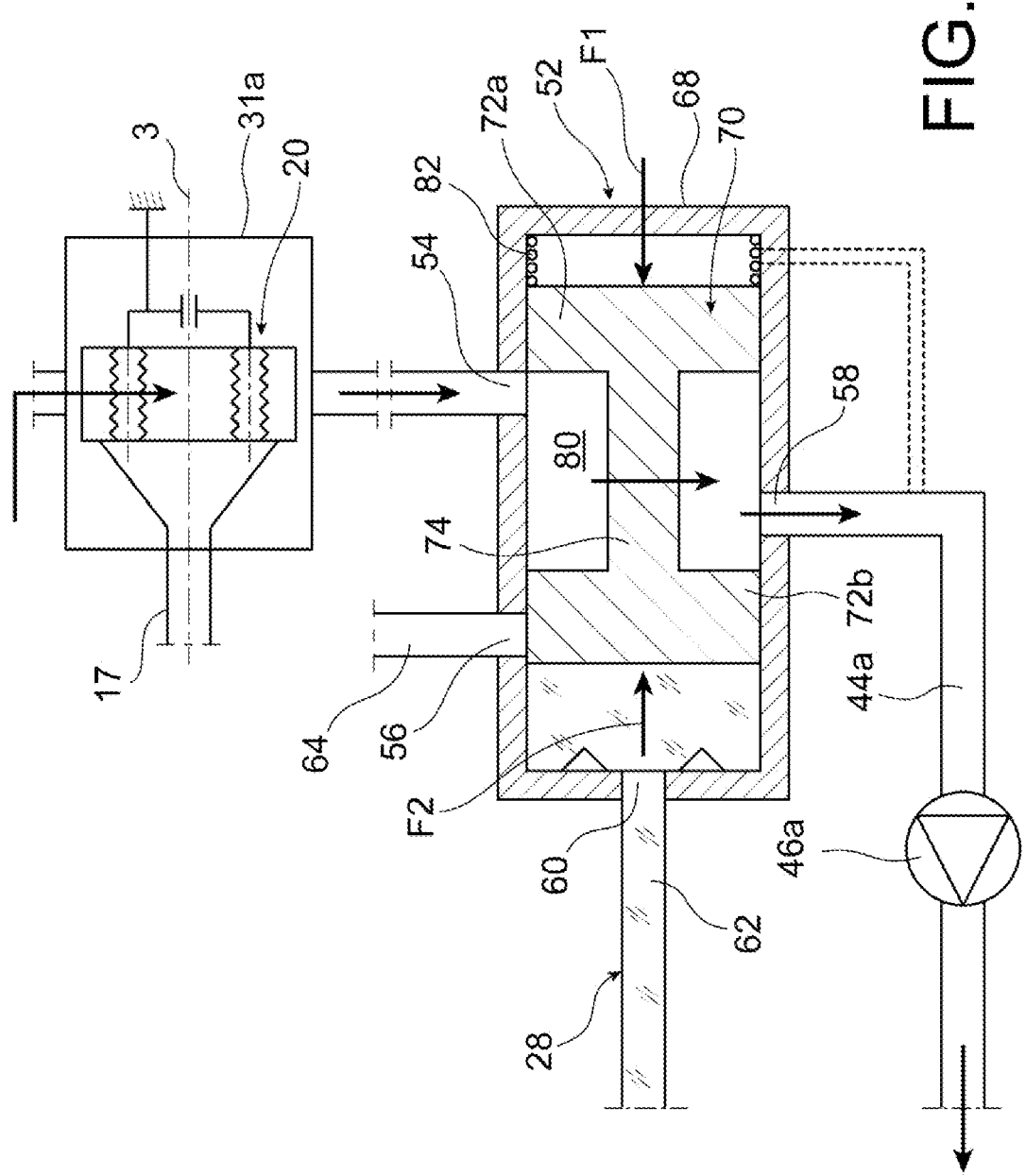
FIG. 3 represents a schematic side view of a portion of the assembly shown in the preceding Figure, with a lubricant dispenser shown in the lubricant recovery configuration, adopted during normal turbojet engine operating conditions.

Now, with reference to FIG. 3, the lubricant dispenser 52 in a more detailed manner. In this FIG. 3, the dispenser 52 is shown in a lubricant recovery configuration, adopted during normal operating conditions of the turbojet engine. This actuator-shaped dispenser includes a body 68 forming the cylinder of the actuator, as well as a member 70 which is movably mounted in the body 68, so as to form the piston of the actuator. The lubricant inlet 54, the secondary lubricant inlet 60, the air inlet 56, and the outlet of the dispenser 58 corresponding to orifices made through the hollow cylinder 68, in which the piston 70 is movable in translation. This piston 70 includes two opposite piston heads 72a, 72b connected by a central connecting member 74, of smaller diameter.

Consequently, an annular fluid circulation chamber 80 is defined between the two piston heads 72a, 72b, which is also delimited internally by the central connecting member 74, and externally by the cylinder 68.

The first piston head 72a is associated with the lubricant inlet 54, which it is capable of sealing or releasing depending on the position of the piston 70 in the cylinder 68. This first piston head 72a is subjected to a first force F1 applied by an elastic return element, for example a compression coil spring 82. This spring 82 is constrained between an axial end of the cylinder 68, and an outer surface of the first piston head 72a.

Moreover, the second piston head 72b is associated with the air inlet 56, which it is capable of sealing or releasing depending on the position of the piston 70 in the cylinder 68. This second piston head 72b is subjected to a second pressure force F2 applied by the lubricant entering the cylinder 68, from the secondary inlet 60.

In FIG. 3, the pressure force F2 overcomes the force F1 of the spring 82, such that the piston 70 is in a first position bringing the dispenser 52 into its lubricant recovery configuration, adopted during normal operating conditions of the turbojet engine. In this lubricant recovery configuration, the second piston head 72b is arranged axially between the air inlet 56 and the dispenser outlet 58, such that the communication between these two orifices 56, 58 is prohibited. However, the piston 70 is arranged in such a manner that the lubricant inlet 54 and the dispenser outlet 58 both open into the annular chamber 80, thus enabling the communication between these orifices 54, 58.

Consequently, in this configuration, the recovery pump 46a sucks only lubricant from the reduction gear enclosure 31a.

The second pressure force F2 forces the piston 70 to the first position represented in FIG. 3, while the first force F1 delivered by the spring 82 forces this same piston 70 to a second opposite position, bringing the dispenser 52 into a lubricant blocking configuration.

Figure 4:
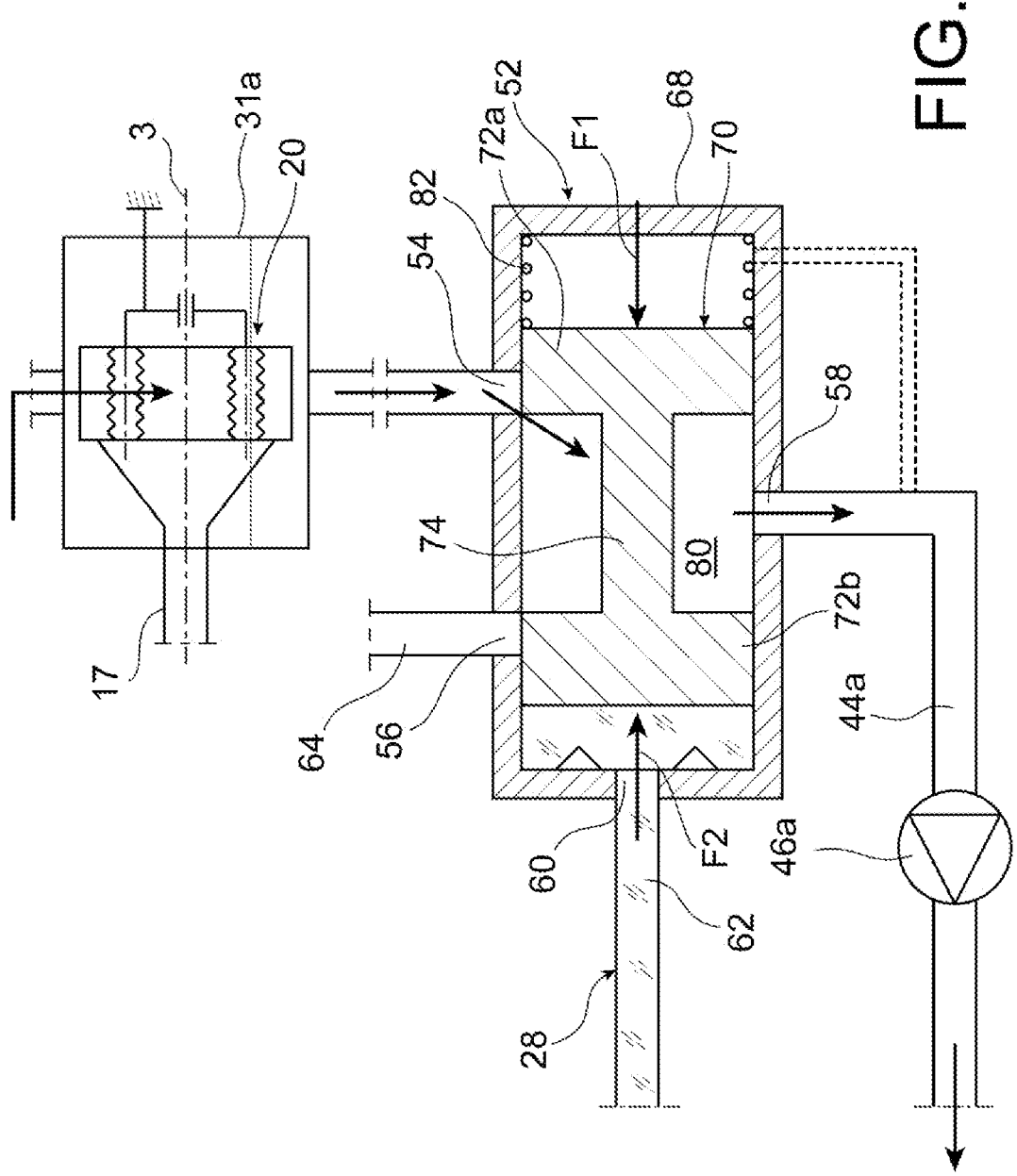
FIG. 4 represents a view similar to the previous one, with the lubricant dispenser shown in a transitional configuration.

Indeed, when the lubricant pressure drops in the supply circuit 28, the second pressure force F2 decreases, which leads the piston 70 to be displaced in the direction of the force F1 delivered by the spring 82. FIG. 4 shows an intermediate configuration in which this displacement of the piston 70 leads the first piston head 72a to almost completely seal the lubricant inlet 54, while the second piston head 72b completely seals the air inlet 56. This intermediate configuration is adopted when the lubricant pressure reaches a threshold value, below which the dispenser switches to its lubricant blocking configuration. Indeed, a continuation of the pressure drop of the lubricant in the connection 62 leads to an additional displacement of the piston 70, whose first piston head 72a then completely seals the lubricant inlet 54, while the second piston head 72b slightly releases the air inlet 56.

Figure 5:
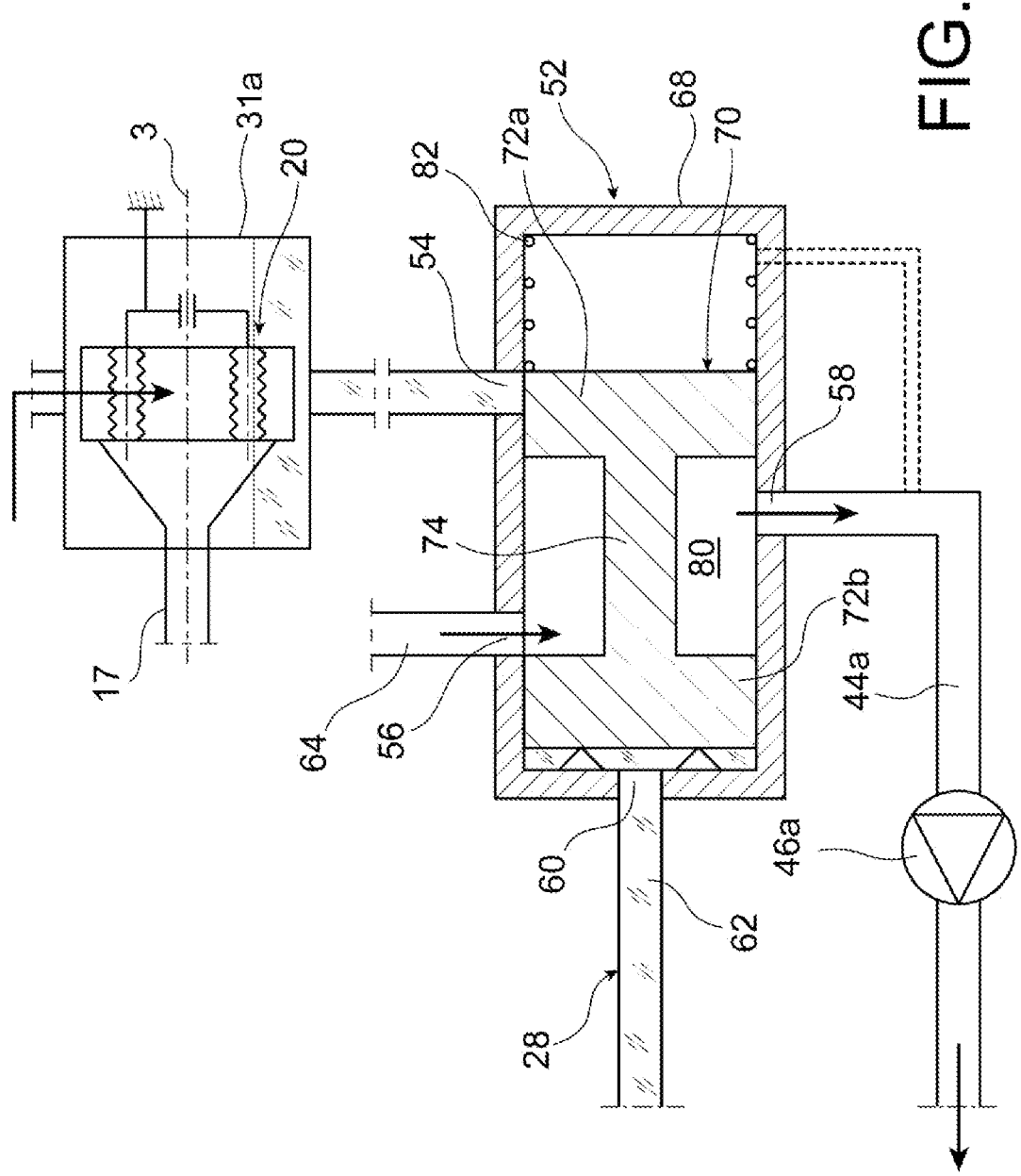
FIG. 5 represents a view similar to the previous one, with the lubricant dispenser shown in the lubricant blocking configuration, as adopted in the case of autorotation of the turbojet engine fan.

FIG. 5 shows the piston 70 in the second position, bringing the dispenser 52 in its lubricant blocking configuration, adopted in the conditions of autorotation of the fan. Under these conditions, the lubricant supply pump is very weakly driven by the high pressure shaft via the accessory gearbox, implying a low lubricant pressure in the supply circuit 28. At the piston 70, the pressure force F2 is thus overcome by the force F1 of the spring 82 which is more expanded. In this lubricant blocking configuration, the first piston head 72a seals the lubricant inlet 54, such that communication between this inlet 54 and the dispenser outlet 58 is prohibited. However, the piston 70 is arranged in such a manner that the air inlet 56 and the dispenser outlet 58 both open into the annular chamber 80, thus enabling the communication between these orifices 56, 58.

Consequently, in this configuration, the recovery pump 46a sucks only air, for example ambient air, and the lubricant is blocked in the enclosure 31a. The suction of air advantageously allows avoiding creating vacuum in the pipe 44a and the annular chamber 80, when the lubricant is no longer sucked in, but maintained in the enclosure 31a. The fact of sucking in air does not prove to be harmful for the recovery pump 46a, since the possible lubrication needs of this pump 46a can be ensured by the low oil flow rate sucked in by the other pumps 46b, 46c of the lubrication group 50.

In the fan autorotation phases, all pumps 38, 46a, 46b, 46b are idling, but a low oil flow rate may continue to circulate through the supply circuit 28, via the pump 38 and in the direction of the enclosure 31a. This allows bubbling the reduction gear 20 in the lubricant which accumulates at the bottom of this enclosure 31a, as shown schematically in FIG. 5.

Possibly, during an autorotation phase, if a maximum filling level must not be exceeded in the reduction gear enclosure 31a, a lubricant overflow conduit can be implanted therein, without departing from the scope of the invention. Preferably, this overflow conduit is provided with a pressure relief valve to discharge the overflow of oil only if the pressure in the enclosure becomes higher than a value predefined as critical. Without this valve, there could be a risk of depressurizing the enclosure via the overflow conduit during the autorotation of the fan.

Of course, various modifications can be made by the person skilled in the art to the invention which has just been described, only by way of non-limiting examples and whose scope is delimited by the appended claims.

What is claimed is:

1. An assembly for an aircraft turbine engine, the assembly comprising a reduction gear for driving the fan of the turbine engine, as well as a lubrication system including:
   a reduction gear enclosure, lubricated and containing the fan drive reduction gear;
   a lubricant tank;
   a lubricant supply circuit connecting the tank to the reduction gear enclosure, the supply circuit comprising a lubricant supply pump;
   a lubricant recovery circuit connecting the reduction gear enclosure to the tank, the recovery circuit comprising a pump for recovering lubricant from the reduction gear enclosure,
   wherein the lubricant recovery circuit includes a controlled lubricant dispenser, comprising:
   a lubricant inlet communicating with a lubricant outlet of the reduction gear enclosure;
   an air inlet; and
   a dispenser outlet communicating with the recovery pump,
   the controlled lubricant dispenser being configured to have several configurations, including:
   a lubricant recovery configuration, in which the controlled lubricant dispenser communicates the lubricant inlet thereof with the dispenser outlet thereof, and prohibits the communication between the air inlet thereof and the dispenser outlet thereof; and
   a lubricant blocking configuration in which the controlled lubricant dispenser communicates the air inlet thereof with the dispenser outlet thereof, and prohibits the communication between the lubricant inlet thereof and the dispenser outlet thereof.

2. The assembly according to claim 1, wherein the controlled lubricant dispenser is controlled depending on the lubricant pressure in the lubricant supply circuit.

3. The assembly according to claim 2, wherein the controlled lubricant dispenser includes a body, as well as a member which is movably mounted in the body between a first position bringing the controlled lubricant dispenser into the lubricant recovery configuration, and a second position bringing the controlled lubricant dispenser into the lubricant blocking configuration for blocking the lubricant in the enclosure, the movable member being subjected to a first force applied by an elastic return element forcing the movable member to the second position, and a second pressure force applied by the lubricant taken from the supply circuit, and forcing the movable member to the first position.

4. The assembly according to claim 3, wherein the controlled lubricant dispenser takes the form of an actuator whose cylinder is formed by the body and whose piston is formed by the movable member, the lubricant inlet, the air inlet, and the dispenser outlet being orifices through the cylinder.

5. The assembly according to claim 4, wherein the piston formed by the movable member includes two piston heads between which a fluid circulation chamber is defined.

6. The assembly according to claim 1, wherein the supply circuit includes a heat exchanger through which the lubricant circulates.

7. The assembly according to claim 1, further comprising:
   at least one turbine engine shaft rolling bearing;
   at least one lubricated motor enclosure containing the rolling bearing.

8. The assembly according to claim 1, further comprising:
an accessory gearbox of the turbine engine;
an accessory gearbox enclosure, lubricated and containing the accessory gearbox; in that
the lubricant supply circuit also connects the tank to the accessory gearbox enclosure; and
the lubricant recovery circuit also connects the accessory gearbox enclosure to the tank, the recovery circuit further comprising a pump for recovering lubricant from the accessory gearbox enclosure,
and in that the lubricant supply pump, the pump for recovering lubricant from the accessory gearbox enclosure, as well as the pump for recovering lubricant from the reduction gear enclosure, are mechanically driven by the accessory gearbox.

9. An aircraft turbine engine comprising an assembly according to claim 1, the turbine engine including a fan driven by the reduction gear of the assembly, a compressor, and the air inlet of the controlled lubricant dispenser communicating with the compressor.

10. An aircraft turbine engine comprising the assembly according to claim 8, further comprising a fan driven by the reduction gear of the assembly, a compressor, and the air inlet of the controlled lubricant dispenser communicating with the compressor,
a motor shaft mechanically driving the accessory gearbox.

\* \* \* \* \*